(12) United States Patent
Mitchell et al.

(10) Patent No.: US 7,472,643 B2
(45) Date of Patent: Jan. 6, 2009

(54) DISPOSABLE FLAVOR INSERT FOR WATER DISPENSER

(75) Inventors: Alan Joseph Mitchell, Evansville, IN (US); Jason Robert Yochum, Evansville, IN (US); Ginger Elayne Patera, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 583 days.

(21) Appl. No.: 11/027,124

(22) Filed: Dec. 31, 2004

(65) Prior Publication Data

US 2006/0144242 A1  Jul. 6, 2006

(51) Int. Cl.
*A47J 31/06* (2006.01)
*A47J 31/00* (2006.01)

(52) U.S. Cl. .............................. 99/295; 99/306; 99/307

(58) Field of Classification Search ................... 99/306, 99/295, 304, 290, 305, 307, 317, 321, 322; 62/389, 391; 426/115, 112
See application file for complete search history.

(56) References Cited

U.S. PATENT DOCUMENTS

| | | | | |
|---|---|---|---|---|
| 2,283,967 A | | 5/1942 | Brown .............................. 53/3 |
| 2,551,219 A | * | 5/1951 | Peters et al. .................. 99/282 |
| 2,589,783 A | * | 3/1952 | Crossley et al. ............... 99/295 |
| 2,743,664 A | * | 5/1956 | Dale ............................. 99/295 |
| 3,260,190 A | | 7/1966 | Levinson ...................... 99/295 |
| 3,292,527 A | | 12/1966 | Stasse .......................... 99/295 |
| 3,295,998 A | | 1/1967 | Goros .......................... 99/282 |
| 3,445,237 A | * | 5/1969 | Gidge ............................ 426/77 |
| 3,450,024 A | | 6/1969 | Martin ......................... 99/295 |
| 3,628,444 A | | 12/1971 | Mazza |
| 4,382,402 A | * | 5/1983 | Alvarez ....................... 99/295 |
| 4,389,925 A | | 6/1983 | Piana ........................... 99/289 |
| 4,584,101 A | * | 4/1986 | Kataoka ...................... 210/474 |
| 4,808,346 A | | 2/1989 | Strenger ...................... 261/18.1 |
| 4,921,712 A | * | 5/1990 | Malmquist .................... 464/77 |
| 4,996,066 A | | 2/1991 | Love et al. ..................... 426/77 |
| 5,111,740 A | * | 5/1992 | Klein ........................... 99/295 |
| 5,243,164 A | | 9/1993 | Erickson et al. ............ 219/10.55 |
| 5,498,757 A | * | 3/1996 | Johnson et al. .............. 426/520 |
| 5,766,453 A | | 6/1998 | Morellanto et al. .......... 210/143 |
| 5,865,094 A | * | 2/1999 | Kealy ........................... 99/291 |
| 6,006,655 A | * | 12/1999 | Bielfeldt et al. ............... 99/306 |

(Continued)

FOREIGN PATENT DOCUMENTS

EP   0326685   8/1989

(Continued)

*Primary Examiner*—Reginald L Alexander
(74) *Attorney, Agent, or Firm*—Kirk Goodwin; Michael D. LaFrenz

(57) ABSTRACT

A water dispenser is provided which includes a housing for the dispenser, a dispensing area associated with the housing and including a space for receiving a receptacle for receiving a charge of water from the dispenser, a water outlet through which water is dispensed into the dispensing area, and a fixed flange support positioned between the water outlet and the dispensing area arranged to receive a flavor insert device in a substantially horizontally sliding manner. The flavor insert device includes a cup having a flange extending around at least a portion of a periphery of the cup, a porous enclosure located in the cup, and a supply of solid flavor particles contained in the porous enclosure.

34 Claims, 7 Drawing Sheets

U.S. PATENT DOCUMENTS

| | | | |
|---|---|---|---|
| 6,260,476 B1 * | 7/2001 | Pope | 99/323 |
| 6,606,938 B2 | 8/2003 | Taylor | |
| 6,672,097 B1 | 1/2004 | Ashley | 62/340 |
| 6,698,228 B2 * | 3/2004 | Kateman et al. | 62/346 |
| 6,740,345 B2 | 5/2004 | Cai | |
| 2002/0078831 A1 | 6/2002 | Cai | 99/295 |

FOREIGN PATENT DOCUMENTS

| | | |
|---|---|---|
| EP | 1101430 | 5/2001 |

* cited by examiner

DISPOSABLE FLAVOR INSERT FOR WATER DISPENSER

BACKGROUND OF THE INVENTION

Water dispensers are known, whether as a stand alone appliance, such as disclosed in U.S. Pat. No. 5,766,453 or in combination with another appliance, such as a refrigeration appliance, for example, as disclosed in U.S. Pat. No. 6,672,097. Typically such water dispensers include a dispensing area which has a space to receive a receptacle, such as a cup, which is to be filled with water from the dispenser.

There are also known arrangements for adding flavors to water as it is dispensed into a receptacle. For example, U.S. Pat. No. 4,996,066 discloses a beverage flavoring cassette to be used in conjunction with a cup that the cassette attaches to. The cassette includes a supply of flavoring particles held within a ring between two filters. The cup and cassette are then placed over a receptacle for the flavored liquid, and water is dispensed into the open top of the cup. After use, the cassette is discarded and the cup must be cleaned so it can be reused with a fresh cassette which is packaged separately.

U.S. Pat. No. 3,292,527 discloses an apparatus for preparing and dispensing beverages from prefabricated cartridges in which the cartridge has a conical or frusto-conical shape with a sealed top opening and an openable apex end of the cone. Held within the cartridge is a loose supply of a product which provides the flavoring to the water. A perforated disc is also provided within the cartridge to provide a pressure drop within the cartridge and to act as a filter for the flavoring product. The sealed top of the cartridge is to be pierced by a water supply conduit when water is to introduced into the cartridge. The cartridge is held in place by lifting the body of the cartridge over a ring shaped support and then dropping the cartridge into the ring shaped support where it is held during the dispensing process.

SUMMARY OF THE INVENTION

The present invention provides an improved disposable flavor insert and water dispenser to allow for ease in flavoring water with a variety of different flavors, and ease in cleanup after the flavored water has been dispensed.

In an embodiment, a flavor insert device is provided including a cup which may have a flange extending around at least a portion of a periphery of the cup, a porous enclosure located in the cup, and a supply of solid flavor particles contained in the porous enclosure. In an embodiment, the cup may have a perforated wall through which the water and dissolved flavor particles leave the cup, and in an embodiment, the cup may be formed from a plastic material, such as polyethylene.

In an embodiment, the cup may include a water inlet and a water outlet and further may include a removable seal covering the water inlet and the water outlet. In an embodiment, the water inlet and the water outlet may be coextensive and a single removable seal may be provided to cover the inlet and outlet.

In an embodiment, the porous enclosure may be a porous bag and the cup may include retaining walls arranged to receive and secure the porous bag therein. In an embodiment, a supply container may be provided for receiving a plurality of flavor inserts, the supply container having a moisture impervious body and a removable lid sealable to the body in a moisture impervious manner.

In an embodiment, the invention provides a water dispenser, including a housing for the dispenser, a dispensing area associated with the housing and including a space for receiving a receptacle for receiving a charge of water from the dispenser, a water outlet through which water is dispensed into the dispensing area, and a fixed flange support positioned between the water outlet and the dispensing area arranged to receive a flavor insert device in a substantially horizontally sliding manner. The water dispenser may be a stand alone appliance, or may be incorporated into another appliance, such as a refrigeration appliance.

DETAILED DESCRIPTION OF THE PREFERRED EMBODIMENT

The present invention is directed to a water dispenser for dispensing a flavored water and to a flavor insert device for use with a water dispenser.

Figure 1:
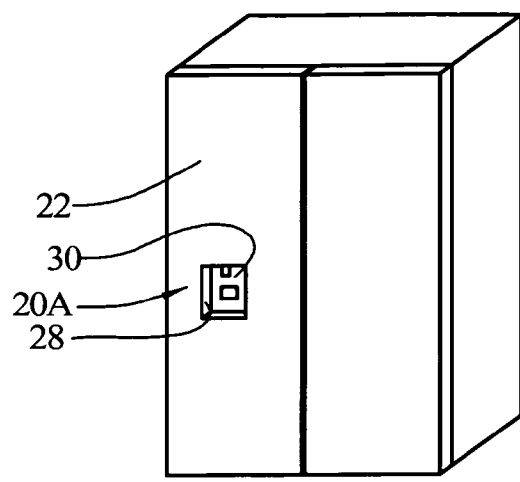
FIG. 1 illustrates a refrigeration appliance incorporating a water dispenser embodying the principles of the present invention.
Figure 2:
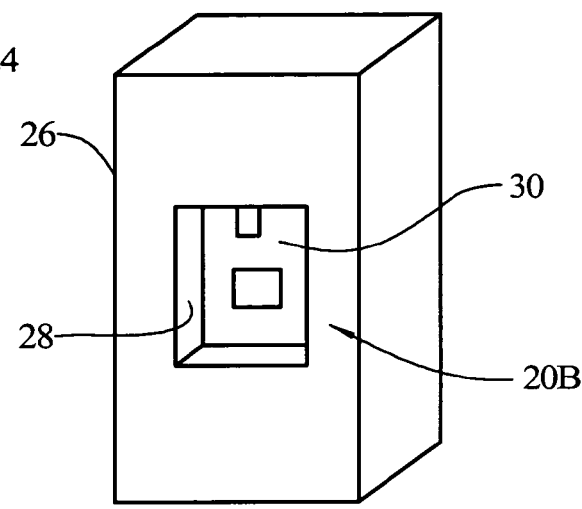
FIG. 2 illustrates a stand alone water dispenser embodying the principles of the present invention.

In FIG. 1, there is illustrated a water dispenser 20A which is located in a door 22 of a refrigeration appliance 24. In FIG. 2, there is illustrated a water dispenser 20B in a stand alone appliance 26. In any environment, whether as a stand alone appliance or as a part of another appliance, the water dispenser 20 (shown isolated in FIG. 3) includes a housing 28 and a dispensing area 30 associated with the housing and including a space (which may be in the form of a recess) for receiving a receptacle 32, such as a drinking glass for receiving a charge of water from the dispenser. A water outlet 34, such as a water dispenser tube is provided, through which water is dispensed into the dispensing area 30. A fixed flange support 36 is positioned between the water outlet 34 and said dispensing area 30 arranged to receive a flavor insert device 40 in a substantially horizontally sliding manner. The fixed flange support 36 may be in the form of a pair of spaced apart generally horizontal flanges spaced slightly below, and laterally to the sides of the water outlet 34. In this manner, the flavor insert device 40 can be positioned close to the water outlet 34 to minimize the space requirements for the flavor insert device, since there is no need to accommodate a full height of the flavor insert device above the fixed flange support 36. The flavor insert device 40 can be installed onto the water dispenser 20 easily from the front of the appliance.

Figure 3:
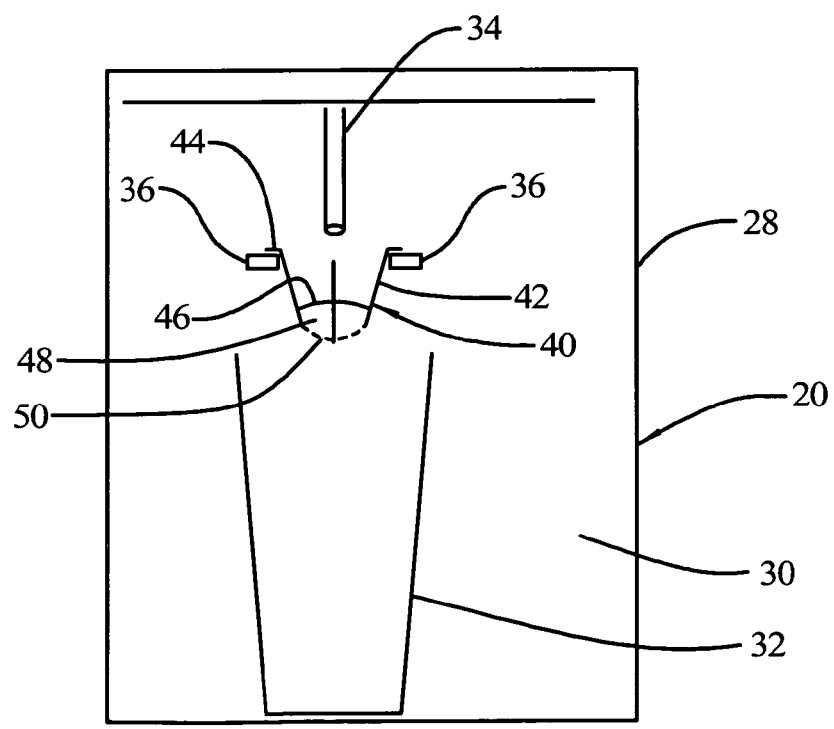
FIG. 3 schematically illustrates a first embodiment of a flavor insert embodying the principles of the present invention.

In FIG. 3 there is schematically illustrated a first embodiment of the flavor insert device 40 which is in the form of a cup 42 having a flange 44 extending around at least a portion of a periphery of the cup. A porous enclosure 46 in the form of a porous bag is located in the cup 42. A supply of solid flavor particles 48 is contained in the porous bag 46. In this embodiment, a wall of the cup 42 is perforated as at 50. The cup 42 may be formed from a variety of materials, and in a preferred embodiment, it is formed of a plastic, such as polyethylene.

The porous bag 46 may be constructed in a variety of manners and from a variety of materials. It may be rigid, semi-rigid, part rigid and part flexible or completely flexible. The bag 46 may be formed of a metal, plastic or fiber perforated material, such as a mesh material including filter paper and tea bag material, or a solid material with a plurality of small openings therein. Preferably the openings are of a size smaller than the individual particles held in the bag 46.

Figure 4:
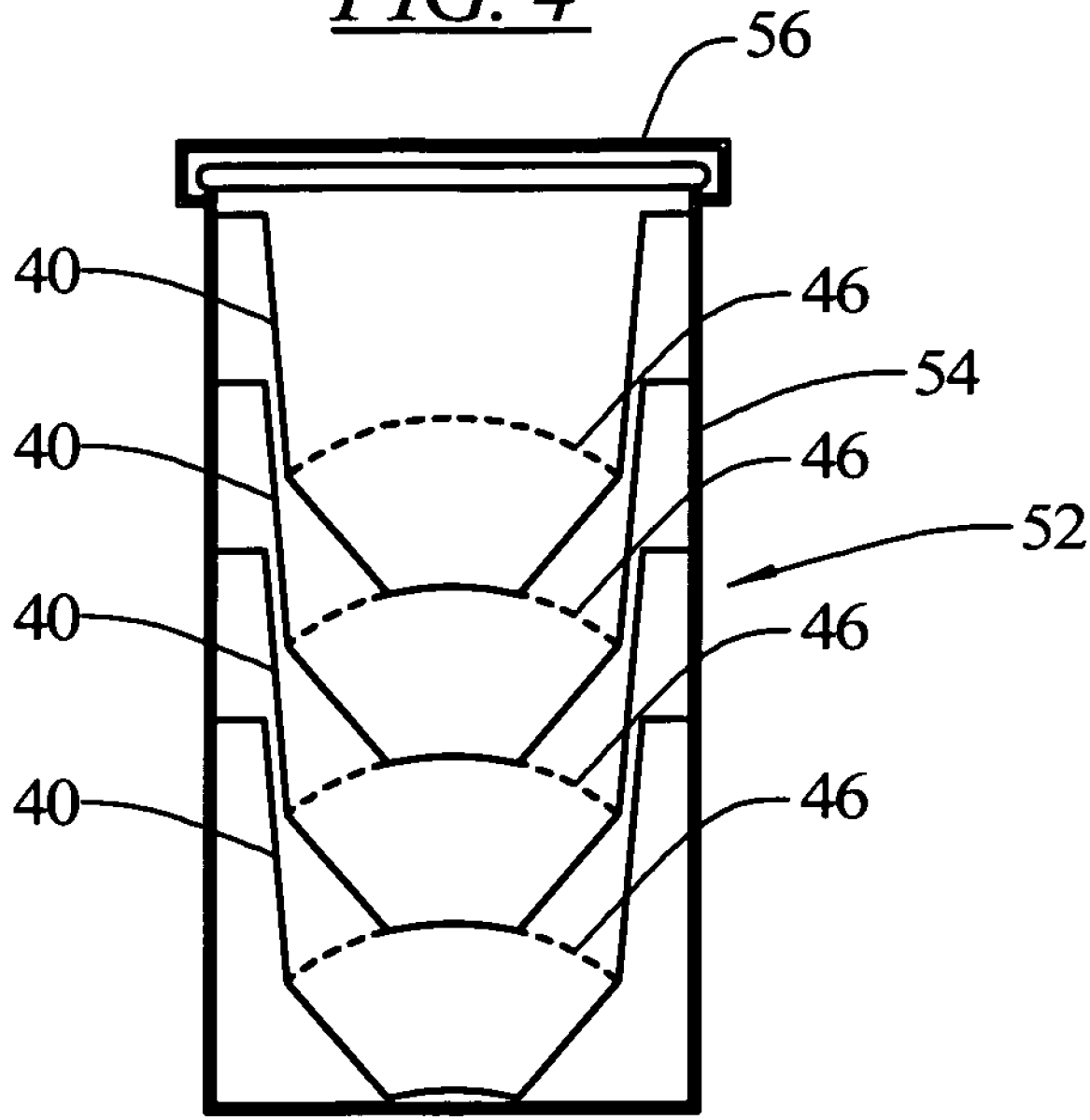
FIG. 4 illustrates a side sectional view of a container for the flavor insert of FIG. 3.
Figure 5:
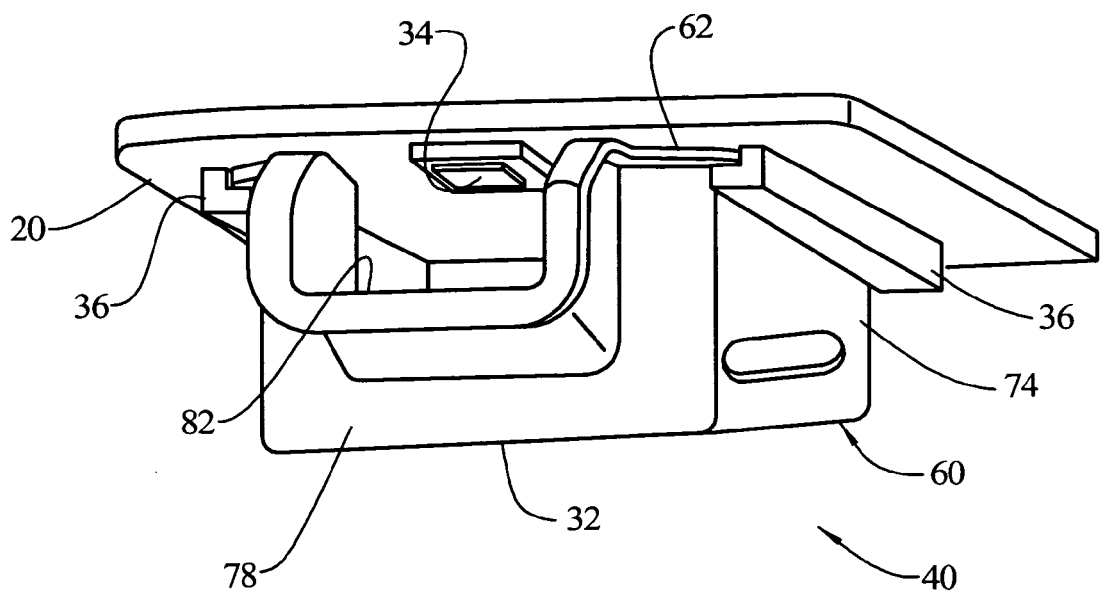
FIG. 5 illustrates a perspective view of a second embodiment of a flavor insert embodying the principles of the present invention as held in a water dispenser.
Figure 6:
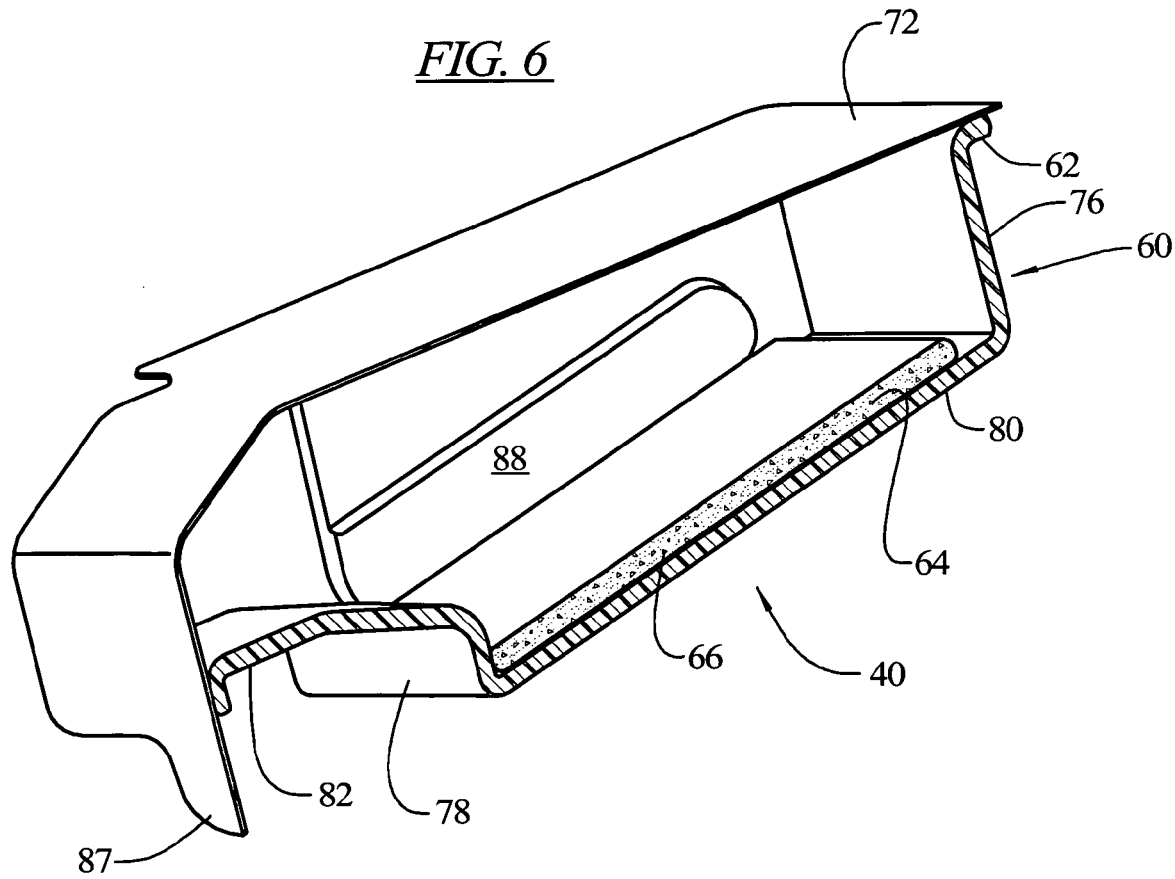
FIG. 6 illustrates a perspective sectional view of the flavor insert shown in FIG. 5.

To use this embodiment, the user selects a flavor insert device 40 of a desired flavor. The flavor insert device 40 may be kept in a supply container 52 (FIG. 4) for receiving a plurality of flavor inserts. Such a supply container 52 may have a moisture impervious body 54 and a removable lid 56 sealable to the body in a moisture impervious manner. Once a flavor insert device 40 is selected, it is inserted into the water dispenser 20 by sliding the flange 44 of the cup 42 onto the flange support 36. If the flavor insert device 40 is formed without a flange, the device may be slid into the flange support 36, with the flange support engaging and supporting the body of the flavor insert device itself. Either way, this will position the flavor insert device 40 directly below the water outlet 34 and above the receptacle 32. When water is dispensed from the water outlet 34, it will enter the open top of the cup 42 and will flow into the porous bag 46 containing the solid flavor particles 48. These solid particles 48, which may be in the form of crystals or powder, will then dissolve into the water and will flow out of the porous bag 46 to flow through the perforated wall 50 of the cup 42 and into the receptacle 32 as flavored water.

After the flavored water is completely dispensed, the receptacle 32 is removed and the flavor insert device 40 is disposed of. There is no mess to clean up since any residual mixture of flavor particles and water is contained within the flavor insert device 40. An endless variety of flavors are available to the user through the selection of an appropriate flavor insert device 40. If no additional flavor is desired, the flavor insert device 40 is not inserted into the dispenser 20, and the water will flow directly from the water outlet 34 and into the receptacle 32 without any hindrance since the flange support 36 is positioned laterally away from the water outlet.

In FIGS. 5-10 a second embodiment of a flavor insert device 40 is illustrated. In this embodiment, the flavor insert device 40 includes a cup 60 comprising a container having a hollow body. The cup 60 has a flange 62 extending around at least a portion of a periphery of the cup. A porous enclosure 64 in the form of a porous bag is located in the cup 60. The bag 64 may be similar in construction to the bag 46 described above. A supply of solid flavor particles 66 is contained in the porous bag 64. In this embodiment, the cup 60 includes a water inlet 68 and a water outlet 70. A removable seal 72 is provided to cover the water inlet 68 and the water outlet 70. The cup 60 may be formed from a variety of materials, and in a preferred embodiment, it is formed of a plastic, such as polyethylene.

In an embodiment as illustrated, the water inlet 68 and the water outlet 70 are coextensive and a single removable seal 72 covers both the inlet and outlet. When the water inlet 68 and the water outlet 70 are separate openings, separate seals 72 will be required.

Figure 7:
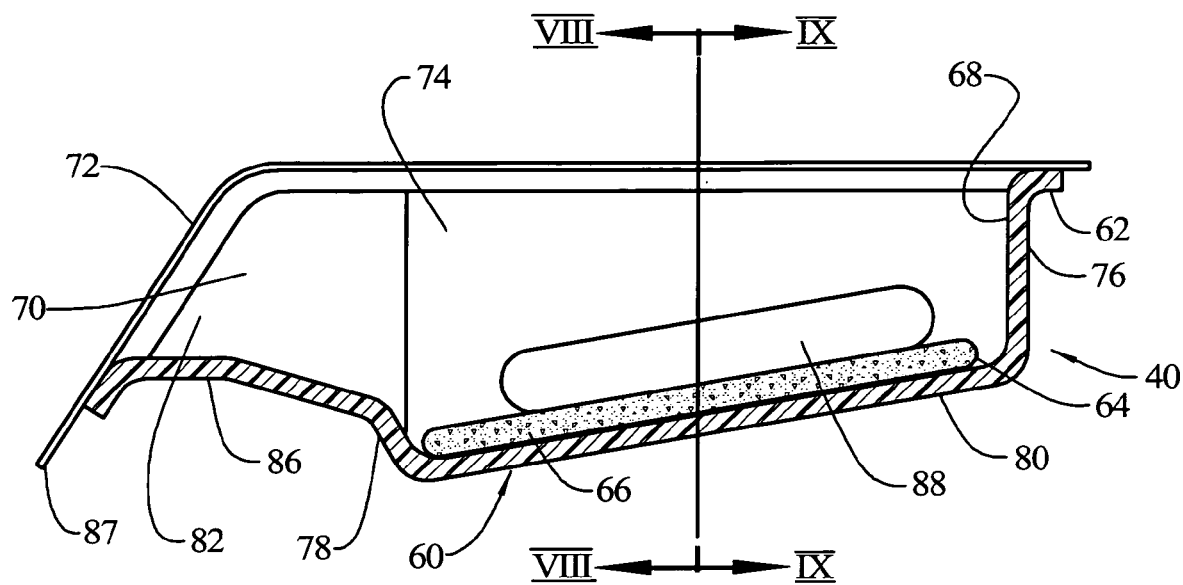
FIG. 7 illustrates a side sectional view of the flavor insert of FIG. 5.
Figure 8:
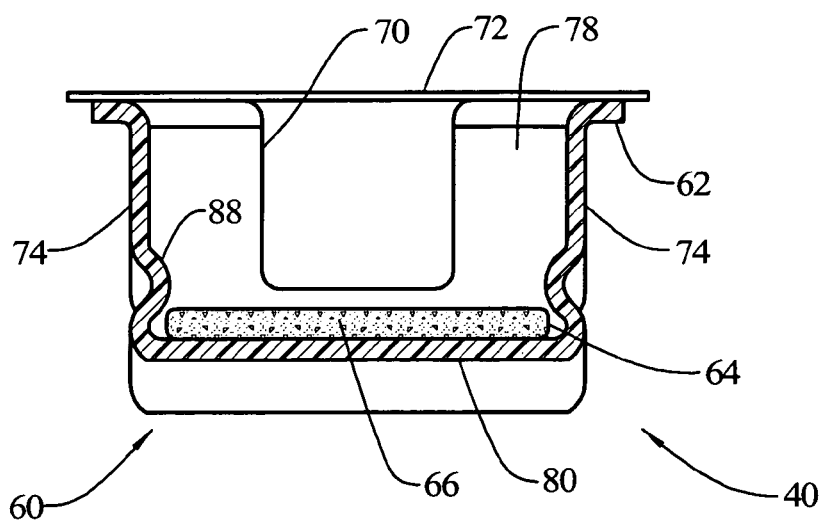
FIG. 8 illustrates a sectional view of the flavor insert of FIG. 5 taken generally along the line VIII-VIII in FIG. 7.
Figure 9:
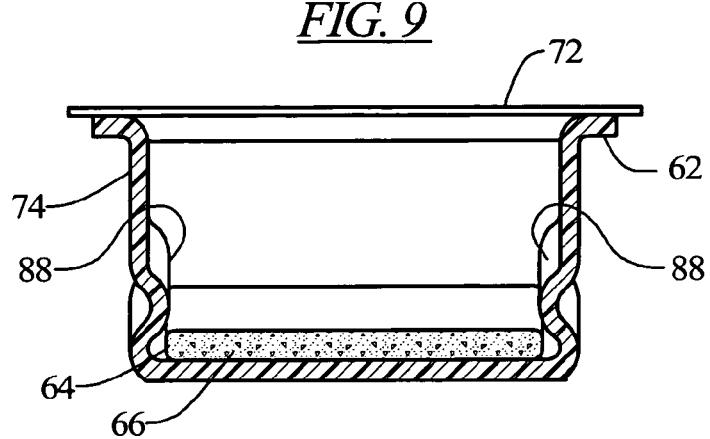
FIG. 9 illustrates a sectional view of the flavor insert of FIG. 5 taken generally along the line IX-IX in FIG. 7.
Figure 10:
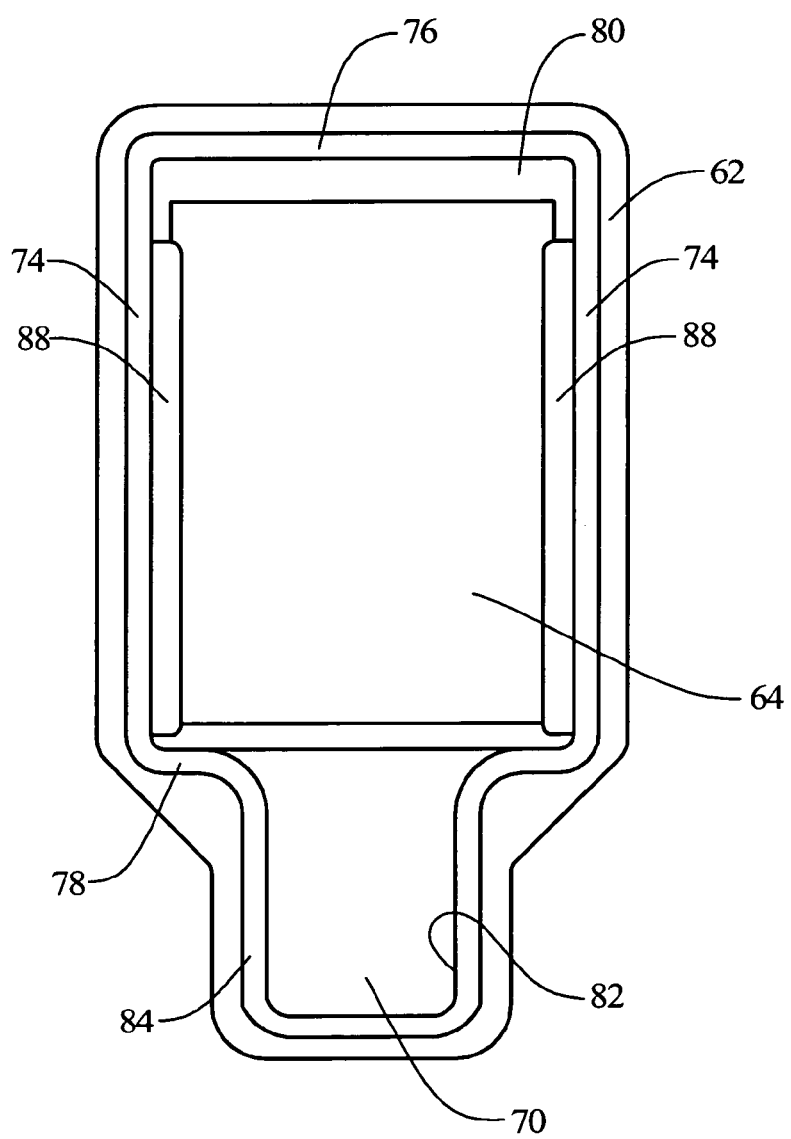
FIG. 10 illustrates a plan view of the flavor insert of FIG. 5 with the foil seal removed.

In the illustrated embodiment, the cup 60 has a generally cubic rectangular shape with upstanding side walls 74, a back wall 76, a front wall 78 and a bottom wall 80. As illustrated in FIG. 7, the bottom wall 80 may slope downwardly from the back wall 76 to the front wall 78. The side walls 74, the back wall 76 and the bottom wall 80 are generally planar and smoothly connect with each other along liquid impervious joints. The front wall 78 is configured to have a spout 82 which defines the water outlet 70. The spout 82 comprises a necked down opening from the hollow interior of the cup 60 in that the spout includes short side walls 84 and a short bottom wall 86 leading to the water outlet 70 at the front side of the cup. The flange 62 extends around the entire periphery of the water outlet 70 and the water inlet 68, which are coextensive.

The seal 72 may be a foil seal, such as a lamination of aluminum foil and polyethylene, which can be applied to the flange 62 of the cup 60 by a well known induction or conduction heating process when the cup is formed of a plastic material. The polyethylene side is placed in contact with the container. When heat is applied, the polyethylene melts and bonds to the polyethylene cup 60. The use of a seal 72 provides that the flavor insert device is a sealed capsule, and no further special handling or use of specially sealed containers is required. The seal 72 can easily be removed from the flange 62 of the cup 60 by a manual grasping of a tab 87 and removal of the seal.

On the interior of the cup 60, retaining walls 88, such as ribs, may be arranged to receive and secure the porous bag 64 within the cup. In the arrangement illustrated, the front wall 78 also provides a short step at the front of the bottom wall 80 to prevent the porous bag 64 from sliding out of the cup 60 towards the spout 82. The porous bag 64 may also be held in the cup 60 simply by a press fit with the sidewalls 74 which then act as retaining walls, or by a heat stake between the porous bag material and one or more of the walls 74, 76, 78, 80 which then act as retaining walls, or other well known retention methods and constructions.

Figure 11:
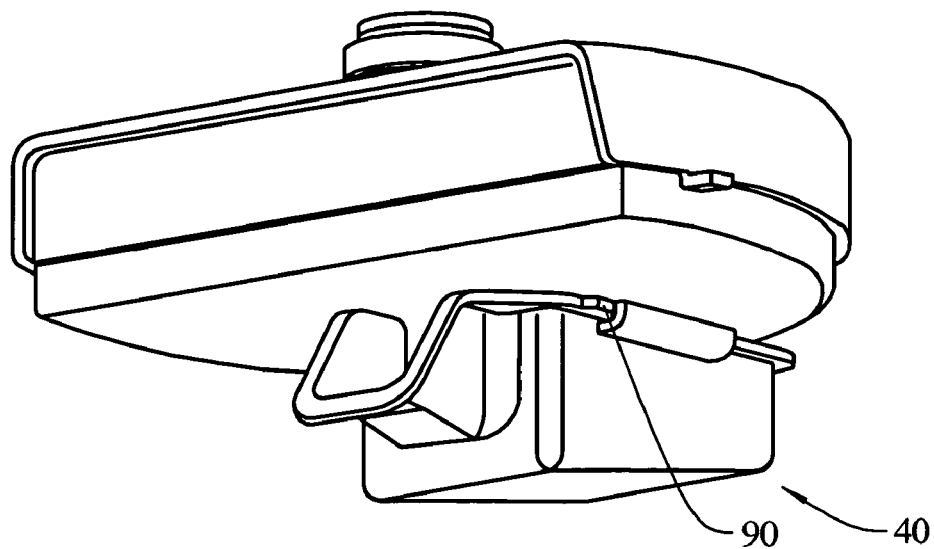
FIG. 11 illustrates a perspective view of a third embodiment of a flavor insert embodying the principles of the present invention as held in a water dispenser.
Figure 12:
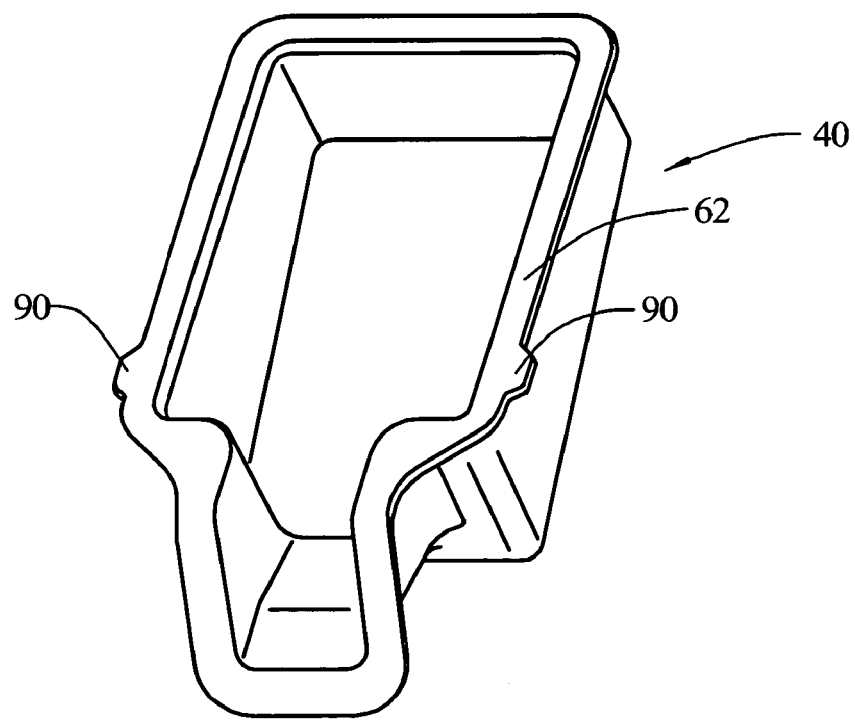
FIG. 12 illustrates a top perspective view of the third embodiment of a flavor insert embodying the principles of the present invention.

To use this embodiment, the user selects a flavor insert device 40 of a desired flavor. Once a flavor insert device 40 is selected, the protective seal 72 is removed. The flavor insert device 40 is then inserted into the water dispenser 20 by sliding the flange 62 of the cup 60 or the cup itself, if not provided with a flange, onto the flange support 36 of the water dispenser 20. This will position the flavor insert device 40 directly below the water outlet 34 and above the receptacle 32. In the embodiment illustrated in FIGS. 5-10, the position of the flavor insert device 40 relative to the water dispenser 20 will be determined by a continuation of the flange support 36 across the back of the flavor insert device receiving area to provide a stop against further movement in the insertion direction. An alternative embodiment is illustrated in FIGS. 11 and 12 in which the flavor insert device 40 is identical in all respects to the embodiment shown in FIGS. 5-10, with the single exception that stop tabs 90 are formed on the flange 62, which stop tabs will engage with the flange support 36 when the flavor insert device 40 is fully inserted into position. This arrangement can be used to avoid the necessity of having the flange support or other stop arrangement extend across the back of the flavor insert device receiving area. In all other respects, the flavor insert devices shown in FIGS. 5-10 and in FIGS. 11-12 are used in an identical manner.

When water is dispensed from the water outlet 34, it will enter the water inlet 68 and will flow into the porous bag 64 containing the solid flavor particles 66. These solid particles 66, which may be in the form of crystals or powder, will then dissolve into the water and will flow out of the porous bag 64 to flow through the spout 82 of the cup 60 and into the receptacle 32 as flavored water.

After the flavored water is completely dispensed, the receptacle 32 is removed and the flavor insert device 40 is disposed of. There is no mess to clean up since any residual mixture of flavor particles and water is contained within the flavor insert device 40. An endless variety of flavors are available to the user through the selection of an appropriate flavor insert device 40. If no additional flavor is desired, the flavor insert device 40 is not inserted into the dispenser 20, and the water will flow directly from the water outlet 34 and into the receptacle 32 without any hindrance since the flange support 36 is positioned laterally away from the water outlet.

Figure 13:
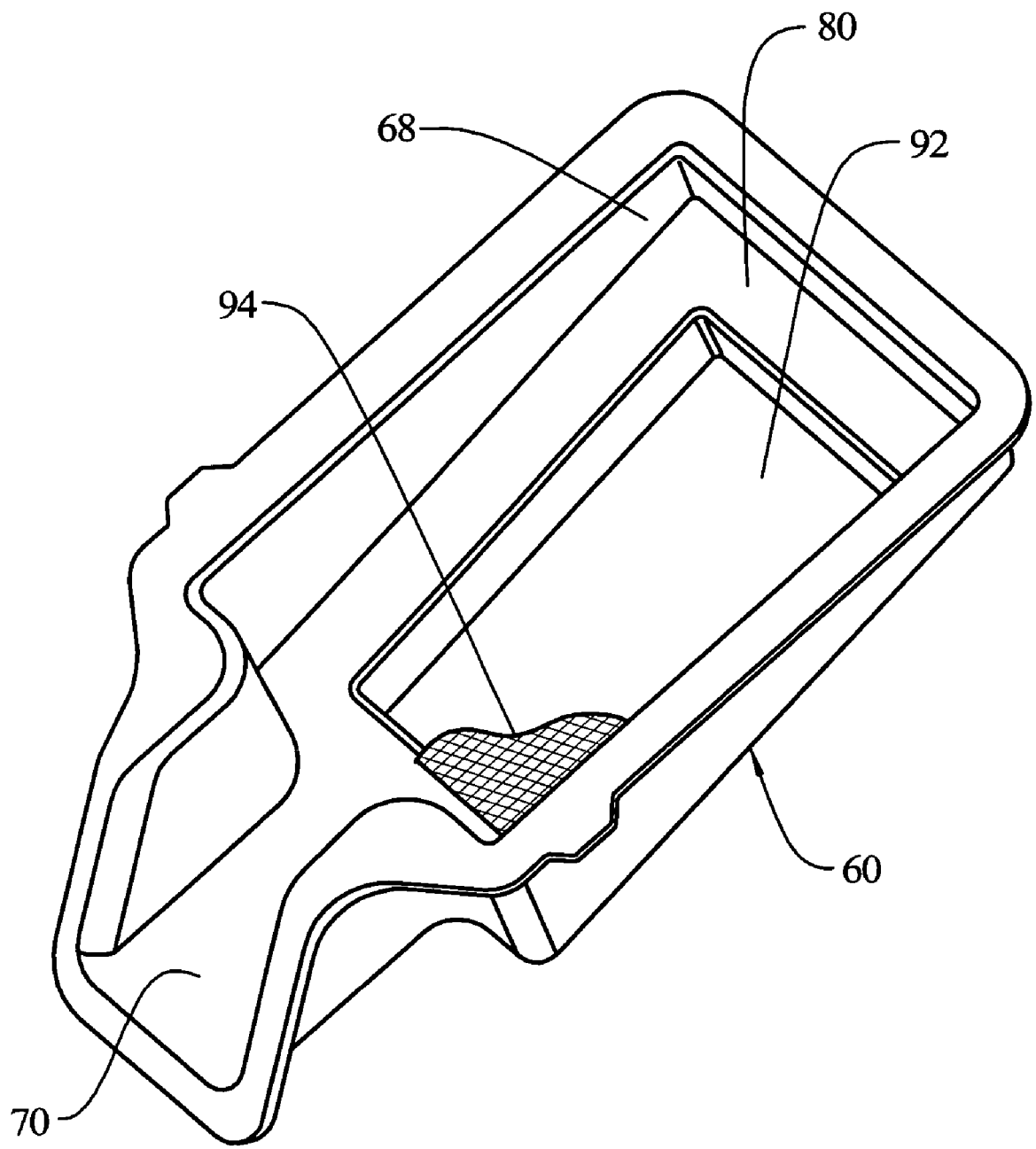
FIG. 13 illustrates a top perspective view of a fourth embodiment of a flavor insert embodying the principles of the present invention.

In FIG. 13 a fourth embodiment of a flavor insert device 40 is illustrated. In this embodiment, the flavor insert device 40 is formed nearly identical to the cup 60 described above, with the exception that a sump or well 92 is formed in the bottom wall 80 of the cup. The supply of solid flavor particles are received in the well 92, and the well is then covered with a porous material 94 to form a porous enclosure within the flavor insert device. The porous material (of any of the types described above) may be heat staked to the bottom wall 80 surrounding the well 92. As described above with respect to FIGS. 6 and 7, a removable seal 72 is provided to cover the water inlet 68 and the water outlet 70. The cup 60 may be formed from a variety of materials, and in a preferred embodiment, it is formed of a plastic, such as polyethylene.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A water dispenser, comprising:
    a housing for the dispenser,
    a dispensing area associated with the housing and including a space for receiving a receptacle for receiving a charge of water from the dispenser,
    a water outlet through which water is dispensed into the dispensing area,
    a support positioned between the water outlet and the dispensing area arranged to receive a flavor insert device in a substantially horizontal manner,
    the flavor insert device comprising a cup including a coextensive water inlet and water outlet and further including a single removable seal covering the coextensive water inlet and water outlet, and a supply of solid flavor particles contained in the cup.

2. A water dispenser according to claim 1, wherein the water dispenser is located in a door of a refrigeration appliance.

3. A water dispenser according to claim 1, wherein the space comprises a recess in the housing.

4. A water dispenser according to claim 1, wherein the water dispenser is a stand alone appliance.

5. A water dispenser according to claim 1, wherein the cup is formed from polyethylene.

6. A water dispenser according to claim 1, including a supply container for receiving a plurality of flavor inserts, the supply container having a moisture impervious body and a removable lid sealable to the body in a moisture impervious manner.

7. A water dispenser according to claim 1, wherein the cup includes a flange extending around at least a portion of a periphery of the cup to which the seal is attached.

8. A water dispenser according to claim 1, wherein the cup has a cubic rectangular shape with a front wall forming a spout with a necked down opening forming the water outlet.

9. A water dispenser according to claim 8, wherein the cup has a bottom wall sloping downwardly towards the front wall to direct liquid in the cup towards the water outlet.

10. A water dispenser, comprising:
    a housing for the dispenser,
    a dispensing area associated with the housing and including a space for receiving a receptacle for receiving a charge of water from the dispenser,
    a water outlet through which water is dispensed into the dispensing area,
    a support positioned between the water outlet and the dispensing area arranged to receive a flavor insert device in a substantially horizontal manner,
    the flavor insert device comprising a cup including a coextensive water inlet and water outlet and further including a single removable seal covering the coextensive water inlet and water outlet, a porous enclosure located in the cup, and a supply of solid flavor particles contained in the porous enclosure.

11. A water dispenser according to claim 10, wherein the water dispenser is located in a door of a refrigeration appliance.

12. A water dispenser according to claim 10, wherein the space comprises a recess in the housing.

13. A water dispenser according to claim 10, wherein the water dispenser is a stand alone appliance.

14. A water dispenser according to claim 10, wherein the cup is formed from polyethylene.

15. A water dispenser according to claim 10, including a supply container for receiving a plurality of flavor inserts, the supply container having a moisture impervious body and a removable lid sealable to the body in a moisture impervious manner.

16. A water dispenser according to claim 10, wherein the porous enclosure comprises a porous bag.

17. A water dispenser according to claim 16, wherein the cup includes retaining walls in the form of a bottom wall and side walls arranged to receive the porous bag and ribs projecting from the side walls to overlie and secure the porous bag in the cup.

18. A water dispenser according to claim 10, wherein the porous enclosure comprises a well formed in a bottom wall of the cup and covered by a porous material, with the solid flavor particles being located in the well, below the porous material.

19. A water dispenser according to claim 10, wherein the cup includes a flange extending around at least a portion of a periphery of the cup to which the seal is attached.

20. A water dispenser according to claim 10, wherein the cup has a cubic rectangular shape with a front wall forming a spout with a necked down opening forming the water outlet.

21. A water dispenser according to claim 20, wherein the cup has a bottom wall sloping downwardly towards the front wall to direct liquid in the cup towards the water outlet.

22. A water dispenser, comprising:
a housing for the dispenser,
a dispensing area associated with the housing and including a space for receiving a receptacle for receiving a charge of water from the dispenser,
a water outlet through which water is dispensed into the dispensing area,
a fixed flange support positioned between the water outlet and the dispensing area arranged to receive a flavor insert device in a substantially horizontally sliding manner,
the flavor insert device comprising a cup including a coextensive water inlet and water outlet and further including a single removable seal covering the coextensive water inlet and water outlet, a porous enclosure located in the cup, and a supply of solid flavor particles contained in the porous enclosure.

23. A water dispenser according to claim 22, wherein the water dispenser is located in a door of a refrigeration appliance.

24. A water dispenser according to claim 22, wherein the space comprises a recess in the housing.

25. A water dispenser according to claim 22, wherein the water dispenser is a stand alone appliance.

26. A water dispenser according to claim 22, wherein the cup is formed from polyethylene.

27. A water dispenser according to claim 22, wherein the porous enclosure comprises a porous bag.

28. A water dispenser according to claim 27, wherein the cup includes retaining walls in the form of a bottom wall and side walls arranged to receive the porous bag and ribs projecting from the side walls to overlie and secure the porous bag in the cup.

29. A water dispenser according to claim 22, wherein the porous enclosure comprises a well formed in a bottom wall of the cup and covered by a porous material, with the solid flavor particles being located in the well, below the porous material.

30. A water dispenser according to claim 22, wherein the cup includes a flange extending around at least a portion of a periphery of the cup and with stop tabs formed on the flange to engage with the fixed flange support upon full insertion of the cup into the water dispenser.

31. A water dispenser according to claim 22, wherein the cup includes a flange extending around at least a portion of a periphery of the cup to which the seal is attached.

32. A water dispenser according to claim 22, wherein the cup has a cubic rectangular shape with a front wall forming a spout with a necked down opening forming the water outlet.

33. A water dispenser according to claim 32, wherein the cup has a bottom wall sloping downwardly towards the front wall to direct liquid in the cup towards the water outlet.

34. A water dispenser, comprising:
a housing for the dispenser,
a dispensing area associated with the housing and including a recessed space for receiving a receptacle for receiving a charge of water from the dispenser,
a water outlet through which water is dispensed into the dispensing area,
a fixed flange support positioned between the water outlet and the dispensing area arranged to receive a flavor insert device in a substantially horizontally sliding manner,
the flavor insert device comprising a polyethylene cup including a coextensive water inlet and water outlet,
a single removable seal covering the coextensive water inlet and water outlet,
the cup having a flange extending around at least a portion of a periphery of the cup to which the seal is attached, and which flange is received on the fixed flange support to hold the cup in the dispensing area,
the cup having a cubic rectangular shape with a front wall forming a spout with a necked down opening forming the water outlet and a bottom wall sloping downwardly towards the front wall to direct liquid in the cup towards the water outlet,
a porous bag located in the cup, and
a supply of solid flavor particles contained in the porous bag.

* * * * *